Nov. 8, 1927.                               1,648,721
C. CLAUS
METHOD OF AND MACHINE FOR FORMING BODIES BY PRESSURE
Filed Jan. 20, 1925          2 Sheets-Sheet 1
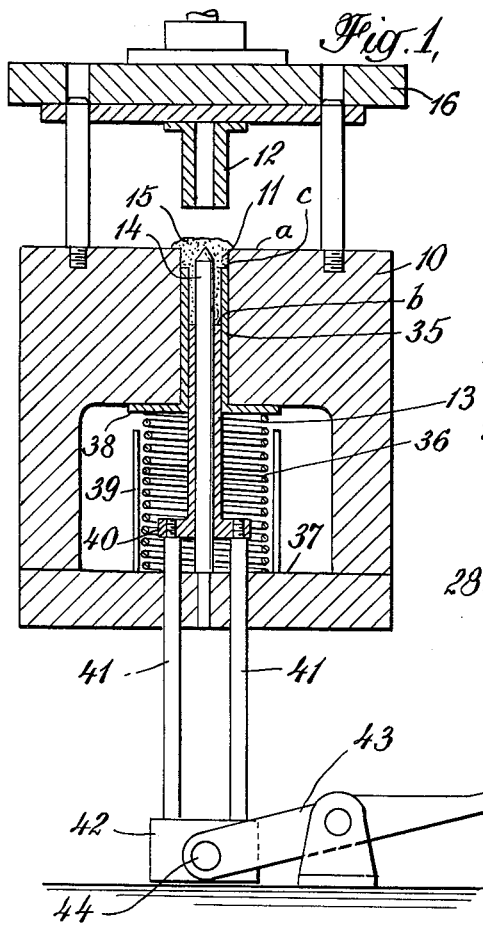
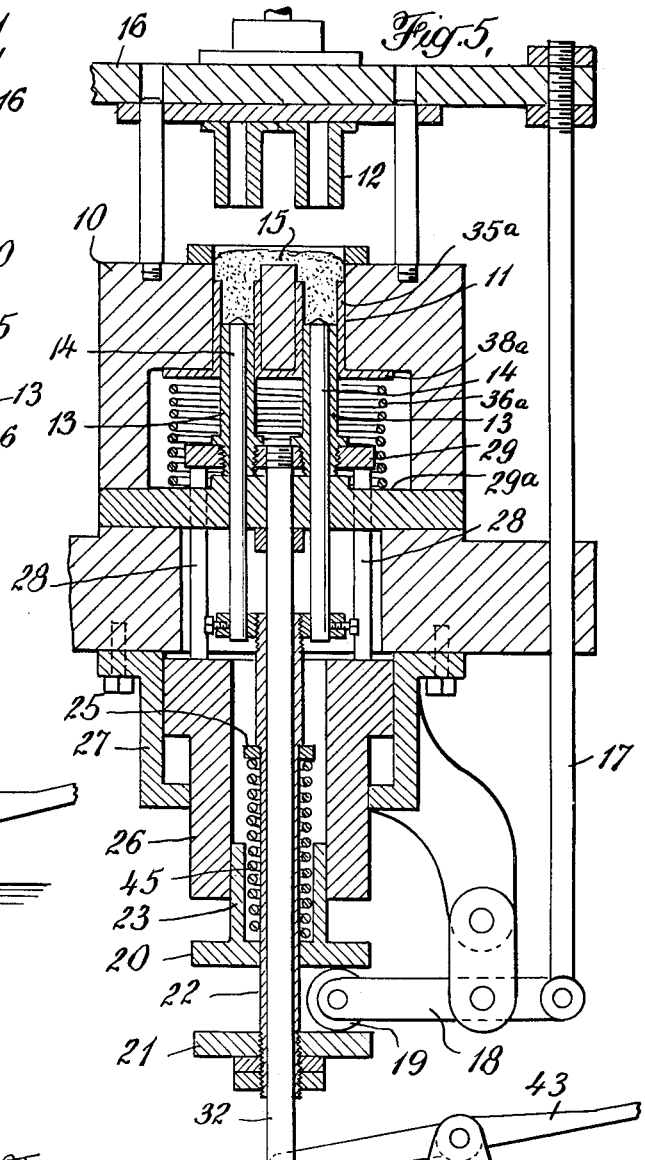
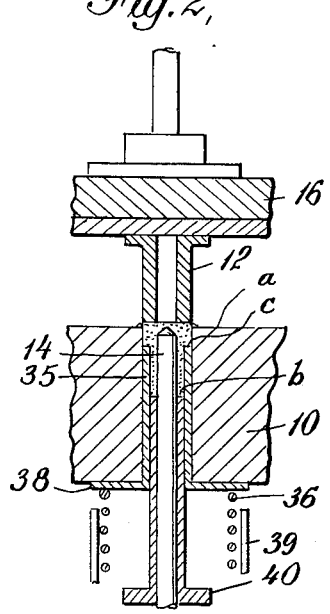
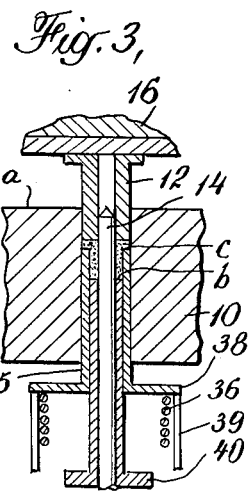
INVENTOR
Carl Claus
BY Willis Fowler,
ATTORNEY Nov. 8, 1927.  
C. CLAUS  
1,648,721  
METHOD OF AND MACHINE FOR FORMING BODIES BY PRESSURE  
Filed Jan. 20, 1925  
2 Sheets-Sheet 2
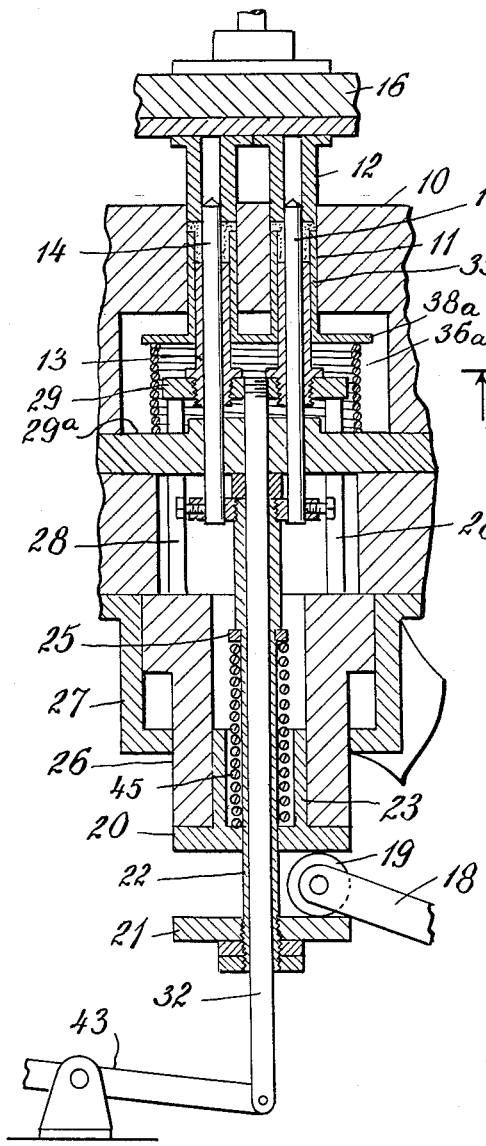
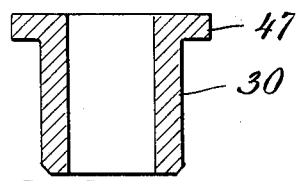
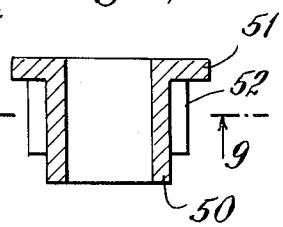
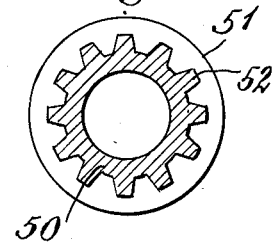
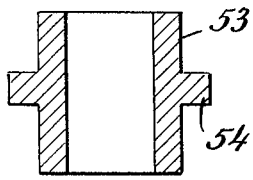
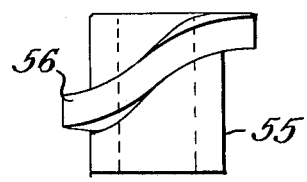
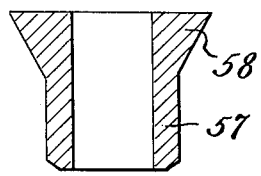
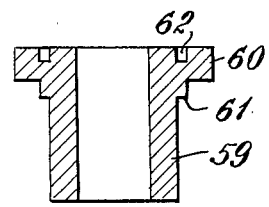
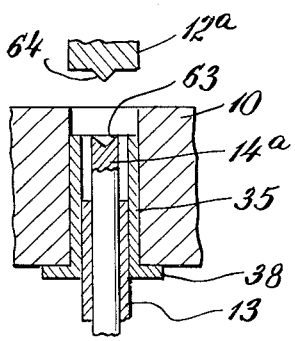
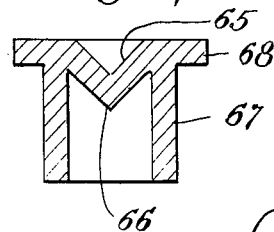
INVENTOR  
Carl Claus  
BY Willis Fowler  
ATTORNEY Patented Nov. 8, 1927.

1,648,721

UNITED STATES PATENT OFFICE.

CARL CLAUS, OF PLAINFIELD, NEW JERSEY, ASSIGNOR TO BOUND BROOK OIL-LESS BEARING COMPANY, OF BOUNDBROOK, NEW JERSEY, A CORPORATION OF NEW JERSEY.

METHOD OF AND MACHINE FOR FORMING BODIES BY PRESSURE.

Application filed January 20, 1925. Serial No. 3,564.

My inventions relate generally to methods of and apparatus for making compressed articles or bodies, and in the present application thereof, my improvements are especially applicable in the use of dies or compressing means acting under pressure upon a charge or mass of compressible material and particularly when the material is in the form of a mixture of powdered or granulated substances, such for example, as the various well-known mixtures of powdered metallic and lubricating ingredients, which have been heretofore used in so-called oilless bearings, or bearings of a porous nature capable of absorbing lubricants, though my present improvements are not limited to this class of articles, and have many different applications and uses, as will be hereinafter pointed out.

The method and the constructions of the machines herein illustrated and described are of a kindred nature to those disclosed in my prior U. S. Letters Patent, 1,607,389 granted on November 16, 1926, and the present application is in part a continuation of my said prior application which matured into the aforesaid patent to which reference may be had in connection herewith. In said prior application, there is disclosed, among other things, the formation of open-ended tubular bodies or bearings, by compressing in dies a charge of powdered or granulated material and using pressure which is exerted with substantially equal force upon all the areas, dimensions or sections of the same, so that all parts of the product are compressed alike by equally acting forces. In cases, however, where the pressed out body is of an irregular shape or form, or has a part or member projecting laterally from the main part of the body, such for example, as a flange or a lug, or a closed end to a tubular body or cup-shaped article, there is present the peculiar condition of a varying quantity, dimension or thickness of material in the direction in which the pressing force is exerted. If in operating the mechanism of said prior application, I desired to form a tubular body having a flange, the material located in the flange part which has a comparatively small mass or thickness in the direction in which the pressing force is applied, would receive all of its required pressure before the greater and thicker mass in the main part would be sufficiently compressed so that said small mass would be compressed into a solid body which would stop the press before the greater mass is sufficiently compressed. This inequality is due to the fact that generally powdered materials under pressure do not act like liquids or plastic materials, which spread and fill a closed container or die with equal pressure in all directions, when the pressure is applied at one place. In my present invention, I therefore use differential resistance so that differences in force and power come into play and thereby secure the desired effects by such differences, and I thereby produce the desired article so that it is uniform in texture and coherency and its various parts are equally dense and firm and have substantially the same hardness, strength and durability. In carrying out my inventions as herein shown, in order to obtain the difference in resistance for the different parts and regulate the same, I use movable parts in such places where excessive compression would occur and have these movable parts yield, while other parts remain fixed and practically non-yielding in order to balance the action and thereby obtain a uniform compression throughout the mass of the article.

While there are various different ways of accomplishing the required variation in pressure at the different desired places of the charge or blank material, I herewith show different ways of utilizing spring mounted means for the purpose and have illustrated types of the same in the accompanying drawings, wherein:—

Fig. 1, shows in vertical section a machine embodying my invention and with the parts thereof in the positions assumed by them when the mold or die is charged with the material prior to the pressing operation.

Fig. 2, is a similar view of parts of the machine shown in Fig. 1, with the upper die lowered into position of contact with the charge.

Fig. 3, is a similar view to Fig. 2, with the upper die moved to its lowermost position wherein it has compressed the charge to its limit and with the auxiliary spring mounted means depressed to its limit.

Fig. 4, is a similar view to Fig. 3, showing the upper die raised and the lower die or mold part moved upwardly to eject the compressed product and with the auxiliary spring member restored to normal position, after the pressing force is removed.

Fig. 5, is a vertical sectional view of a machine like that shown in my co-pending application hereinabove referred to, and which is modified to equip it to give the differential pressure involved in the present invention. This machine is shown with the parts in their relation at the beginning of a pressing operation after the dies or molds have been suitably charged.

Fig. 6, is a view similar to that of Fig. 5, and shows the position of the parts at the end of a compressing operation.

Figs. 7 to 12, inclusive, and Fig. 14, show different forms or shapes of bodies made in accordance with my improvements and which embody my invention.

Fig. 13, is a detail view in vertical section of dies or molds constructed and arranged to produce the compound form of article shown in vertical section in Fig. 14, on a large scale.

Referring to the drawings, 10 is a mold-member which is provided with a cylindrical mold or die chamber 11, which extends through the body of said member 10, and receives in its respective ends the annular die-members 12 and 13, the former being forced downwardly therein and the latter upwardly therein. A cylindrical core-member 14 is arranged in the center of the die-member 13, which has a sliding fit therewith, the lower end of said core being secured in the mold-block 10, with its upper end about on a level with the plane of the upper end or table part of said block. An auxiliary die member or sleeve 35, surrounds the die-member 13, in sliding contact therewith and the exterior of said sleeve 35, fits slidingly within the cylindrical chamber 11 of the mold-member. A helical spring 36 has its lower end resting upon a fixed part 37, of the member 10, while the upper end of the spring engages an annular abutment or flange 38, on the lower end of the auxiliary die-member 35, and normally keeps the latter raised to its upper limit of movement. An suitable stop 39, fixed on the mold-member 10, beneath the abutment 38, checks the downward travel of the auxiliary die member 35, at a suitable point. In some cases the particular mixture employed, renders the use of the stop unnecessary. The spring 36, surrounds the lower end of the vertically movable die member 13, which carries at its extreme end a fixed piece 40, to which are secured the vertically reciprocating posts 41, which pass through suitable openings in the mold-block 10, and are provided at their ends with a head 42, to which a treadle 43, is pivoted at 44. By the operation of the lever 43, the die member is forced up through the auxiliary member 35, into position to eject the pressed body 30.

The reciprocating die carrier or head 16, to which the upper die 12, is secured, is operated by any suitable power and its descent causes the die to enter the upper end of the chamber 11, and compress the charge from above and towards the lower die member 13, which remains stationary during such compression, though it may be forced upwardly as the upper die descends and by the same power which actuates said upper die, if preferred.

With the parts in the relative positions shown in Fig. 1, a charge 15, of the granular mixture is placed in the appaartus so as to completely fill the annular space between the core or mandrel 14, and the auxiliary die member 35, the bottom of which space is closed by the upper end of the lower die member 13, likewise the annular space between the said core and the inner wall of the chamber 11 and above the upper end of the auxiliary die 35, and the surplus material is then scraped away leaving the charge about level with the plane of the upper surface of the mold-block, indicated at $a$. This condition is shown in Fig. 2, wherein the upper die is descending and it will be noted that the depth and mass of material contained in the body part lying between the planes indicated at $a$, and $b$, (the latter being the level of the upper end of the lower die 13 in its low position), is much greater than that lying between plane $a$, and plane $c$, containing the upper end of the auxiliary die 35, and which shallow part in this instance constitutes a flange on the body part. As the upper die descends into its lowermost position, as shown in Fig. 3, the charge is thereby compressed in the direction of and against the lower die and at the same time the upper die exerts its pressure on the material between it and the upper end of the auxiliary die and causes said auxiliary die to yield on its spring-mounting and to that extent reduce the pressure on the material so located, while the greater mass of material on which is exerted a non-yielding pressure by reason of the construction of the die connections, may at the same time receive its necessary amount of pressure. In this way and by means of spring mounting in this particular construction of my invention, I provide the desired difference of action and vary it in accordance with the dimensions and bulks of the material at different places in the charge, reckoned in the direction in which the pressure is exerted. When the action of the dies is completed and the compression of material terminated, as shown in Fig. 3, the auxiliary die 35, has been depressed to its lowermost limit, whereupon the upper die is moved to its uppermost and normal position, as shown in Fig. 4, and the finished pressed body 30, is left free to be ejected by the force of the full upward movement of the lower die 13, into a position clear of the mold so that the body can be quickly removed. In this same action, the auxiliary die 35, is automatically restored to its normal position by the action of its spring.

In Figs. 5 and 6, I show the construction of machine contained in my said pending application Serial No. 671,032, provided with my present improvements. This is accomplished by adding thereto an auxiliary die member 35$^a$, having two upwardly extending tubular parts fitting the duplex mold chambers 11, 11, and having at its lower end a suitable fixed part or abutment 38$^a$, for engaging the end of the spring 36$^a$, the lower end of which rests on the part 29$^a$, and said auxiliary die is moved down and up in the same manner as hereinabove described, and has a sliding movement on the exterior of the lower die 13, and also slides within the mold or die chamber 11. The various parts of this machine are numbered like those in said prior application, to which reference may be had for a fuller understanding of the operation of the said parts and which is the same in the present machine, including the final ejection of the compressed body 30, as indicated in Fig. 4, the compression varying in force in the different areas as hereinbefore described.

The compressed body 30, shown in enlarged size in Fig. 7, is provided with an external flange 47, at one end, and is a simple form of device or bearing bushing, which being made from granulated or powdered substances by my improved method and machine, as hereinabove described, has had its thin and thick parts, reckoned as such in the direction in which the compression force has been exerted, acted upon by a less force for the thin part and a greater force for the thick part, so that the part of the flange is substantially of the same density and consistency as the main part of the structure.

There are many different forms and shapes of articles which may be made in accordance with my present improvements, and I have herein illustrated several of the different forms. Figs. 8 and 9, show in vertical and horizontal sections, respectively, a tubular device 50, having an external flange 51, at one end and from which extend longitudinally for part of the length of the tube, external projections or teeth 52. In Fig. 9$^a$, I show in vertical section a cylindrical tubular body 53, having an external flange 54, extending around the center thereof. In Fig. 10, which shows the article in elevation, the cylindrical body 55, is formed with an external rib or flange 56, having a diagonal or spiral trend. In Fig. 11, I show an article of hollow cylindrical form 57, with an outwardly flaring flange 58, at one end. In Fig. 12, I show a hollow cylindrical body 59, having at one end an external flange 60, provided with an annular shoulder 61, and with its outer face formed with an annular groove 62. In all of the above referred to forms of the pressed article, the part or parts which project from or overhang the main part of the structure, is formed in the compressing operation, under a lesser pressure than the said main part, as above described, so that all parts of the compressed material receive practically the same compression.

In Fig. 13, I show a modification of the mechanism for producing different pressures. In this form, the core member 14$^a$ is mounted so that it yields when its upper end is pressed upon, in the same way as the auxiliary die 35, and the material of the charge covers the upper end of the core, so that the pressure of the upper die compresses the charge into a cup-shaped body shown in enlarged size in Fig. 14. By forming the upper end of said yielding core member with a conical shaped depression and the face of the upper die 12$^a$, with a conical projection 64 fitting said depression, the bottom 65, of said body is formed with a pushed up or interiorly raised center 66, while the end of the main part 67, is formed with the flange 68.

It will of course be understood that with each different shape of article to be produced, the upper and lower dies and the auxiliary die member are constructed and arranged to accommodate the particular shape of article in hand, and that many variations may be made in the form of the dies, particularly the auxiliary ones, which serve to reduce the force of compression at the desired places, while the full or unyielding force is exerted at the other places.

My improvements are applicable in the manufacture of a great variety of goods and articles which are produced by molds and dies by compressing powdered, granulated or semi-plastic materials. I have successfully employed my improvements in the manufacture of so-called oil-less bearing bushings, from mixtures of powdered materials, such as copper, zinc, tin and graphite, with lead added in some cases, from which I have produced the compressed bodies, which are then heat-treated to produce the desired consolidation of the particles and provide a coherent and unitary mass having the required hardness. After this heat treatment the bushings may be soaked in oil which will be taken up by the porosity of the material caused by the heating of the same. These bushings are sized in the usual way to finish them.

The various forms of the pressed articles which I have herewith illustrated comprise in the main part a hollow cylindrical body so that in the formation of the same the compressing force is applied in the direction of the axial line of the bodies and which direction accords with that of the greatest thickness and also the lesser thickness, though with other forms which may be made in accordance with my improvements, the pressing force may be applied in a non-axial direction.

I have made bearing bushings from a mixture of the granulated materials hereinabove referred to by the use of my improved method and machine. In some cases I have found that the granular material when finally compressed under the action of the dies, is about one-half the depth or dimension in both the thin and thick places, of the charge of material before compression.

Having thus described my invention, what I claim and desire to secure by Letters Patent is:—

1. The method of producing by compressing material, bodies having varying thicknesses or dimensions in the direction of compression, which consists in compressing a charge of material in the direction of the varying thickness or dimension and causing the compression of the thicker dimension to be exerted from opposite directions thereon, while the compression of the thinner dimension is effected by yielding compression.

2. The method of producing by compressing material, bodies having varying thicknesses or dimensions in the direction of compression, which consists in compressing a charge of material in the direction of the varying thickness or dimension and causing the compression of the thicker dimension to be exerted thereon from opposite points by positive action, while the compression of the thinner dimension is produced by yielding compression exerted by positive action from one direction.

3. The method of producing by compressing material, bodies having different thicknesses or dimensions in the direction of compression, which consists in compressing a charge of material in the direction of the different thickness or dimension and causing the compression of the thicker dimension to be exerted simultaneously from opposite directions by positive action thereon and at the same time causing said thinner dimension to be compressed by pressure thereon with a yielding resistance thereto.

4. The method of producing by compressing material, annular bodies having different thicknesses or dimensions in the direction of compression, which consists in withdrawing a core-forming member from a mold chamber, then in charging material into the chamber, then in moving the member into the chamber to dispose the material in an annular mass, then in forcing annular die members towards each other to compress from opposite points the thicker dimension of the mass, and then in compressing the thinner dimension of the mass with a yielding pressure.

5. The method of producing by compressing material, annular bodies having lateral projecting portions of less thickness in the direction of compression than the main part, which consists in charging a mold chamber with granulated or powdered material, then forcing annular dies towards each other to compress the charge from opposite points to form the body of article, and then compressing the laterally projecting portions with a yielding pressure.

6. In apparatus for forming by compressing material, bodies having different thicknesses or dimensions in the direction of compression, oppositely arranged dies movable towards each other to compress simultaneously from opposite directions the thicker part of the charged material, and an auxiliary die yieldingly mounted and cooperating with one of the first mentioned dies to compress therebetween the thinner part of the charged material.

7. In apparatus for forming by compressing material, annular bodies having different thicknesses or dimensions in the direction of compression, a pair of oppositely acting annular dies for compressing the thicker part of the charged material from opposite points, and a yieldingly mounted die cooperating with one of said first mentioned dies for acting with yielding compression on the thinner part of the charged material.

8. In apparatus for forming by compressing material, annular bodies having varying thicknesses or dimensions in the direction of compression, a pair of oppositely acting annular dies, a core-forming member movable into the interior of said annular dies which act upon the longer dimension of the charged material, a yieldingly mounted annular auxiliary die surrounding one of said first mentioned dies and cooperating in the compression operation with the other of said first mentioned dies and acting upon the shorter dimension of the charged material.

9. In apparatus for forming by pressure, bodies from compressible material, a mold-chamber having a centrally arranged core-member spaced from the walls of said chamber, a die-member movable into and out of the outer end of said mold-chamber, an auxiliary die-member fitting within said mold-chamber with a space between said member and the said core-member and yieldingly mounted therein, a closure at the inner end of said space between said core and auxiliary die-member against which the material is pressed.

10. In apparatus for forming by pressure, bodies from compressible material, a mold-chamber having a centrally disposed core-member with an intervening space between the two, an auxiliary die-member fitting within said mold-chamber with a space between said member and said core-member and engaged by said material under compression and mounted so as to give or yield under said compression, an upper-die movable in and out of the outer end of said mold-chamber, and a second die-member arranged between said core-member and said auxiliary die-member and mounted so as not to yield under compression of the material.

11. In an apparatus for forming by pressure, bodies from compressible material, a mold-chamber having a centrally arranged core-member with an intervening space between the two, a spring-mounted auxiliary die-member fitting within said mold-chamber with a space between said member and said core-member and engaged by the material under compression, a stop for limiting the yielding movement of said auxiliary die-member, a die-member movable into and out of the outer end of said mold-chamber, and a second die-member disposed at the inner end of said mold-chamber between said core-member and said auxiliary die-member.

12. In apparatus for forming bodies by pressure from compressible material, a mold-chamber having a core-member arranged therein with an intervening space between the two, an auxiliary die-member fitting within said mold-chamber with a space between said member and said core-member and adapted to yield under pressure of the material, a die-member movable into and out of the outer end of said mold-chamber, and a second die-member arranged in the other end of said mold-chamber between said core-member and said auxiliary die-member and movable between the two and towards said first mentioned die-member.

In testimony whereof, I have hereunto set my hand.

CARL CLAUS.